(12) United States Patent
Johannesen

(10) Patent No.: US 8,534,355 B2
(45) Date of Patent: Sep. 17, 2013

(54) GAS VALVE AND PRODUCTION TUBING WITH A GAS VALVE

(75) Inventor: Eilif H. Johannesen, Rådal (NO)

(73) Assignee: Statoil Petroleum AS, Stavanger (NO)

( * ) Notice: Subject to any disclaimer, the term of this patent is extended or adjusted under 35 U.S.C. 154(b) by 343 days.

(21) Appl. No.: 12/600,782

(22) PCT Filed: May 22, 2008

(86) PCT No.: PCT/NO2008/000177
§ 371 (c)(1),
(2), (4) Date: Jan. 22, 2010

(87) PCT Pub. No.: WO2008/143522
PCT Pub. Date: Nov. 27, 2008

(65) Prior Publication Data
US 2010/0186832 A1 Jul. 29, 2010

(30) Foreign Application Priority Data
May 23, 2007 (NO) .................................... 20072639

(51) Int. Cl.
*E21B 43/12* (2006.01)

(52) U.S. Cl.
USPC ......... 166/250.15; 166/386; 166/54; 166/321

(58) Field of Classification Search
USPC ............... 137/509; 166/250.03, 250.15, 386, 166/54, 321, 373, 115, 316
See application file for complete search history.

(56) References Cited

U.S. PATENT DOCUMENTS

| 3,536,090 A | 10/1970 | Scott, Jr. |
| 3,807,429 A | 4/1974 | Breton |

(Continued)

FOREIGN PATENT DOCUMENTS

| GB | 2320938 | 7/1998 |
| GB | 2 405 655 A | 3/2005 |

(Continued)

OTHER PUBLICATIONS

International Search Report dated Sep. 5, 2008 for Application No. PCT/NO2008/000177.

*Primary Examiner* — William P Neuder
*Assistant Examiner* — Ronald Runyan
(74) *Attorney, Agent, or Firm* — Birch, Stewart, Kolasch & Birch, LLP

(57) ABSTRACT

A valve (30) for a production liner (12) in connection with the extraction of oil and gas, arranged to automatically shut of the flow of fluid into the production liner (12) in the event of a gas break-through, whereby the valve (30) comprises a valve seating (32) containing at least one central inflow channel (34) and one or more outflow channels (36, 38) from the valve (30). The valve (30) is constructed with a curved design equal to the shape of the outer diameter of the production liner (12), and is placed on the outside of the production liner (12), and in that a rectangular shut off disk (40) with the same curving is arranged in the valve (30), in the flowing path of the liquid flow, to cause a high velocity flow over the shut off disk's surface (40a) against the valve seat (32), wherein the shut off disk (40) is adapted to seal against said valve seat (32) dependant on the differential pressure being produced by the viscosity of the passing flow. The invention also comprises a production liner containing a valve.

15 Claims, 6 Drawing Sheets

(56) References Cited

U.S. PATENT DOCUMENTS

Figure 1:
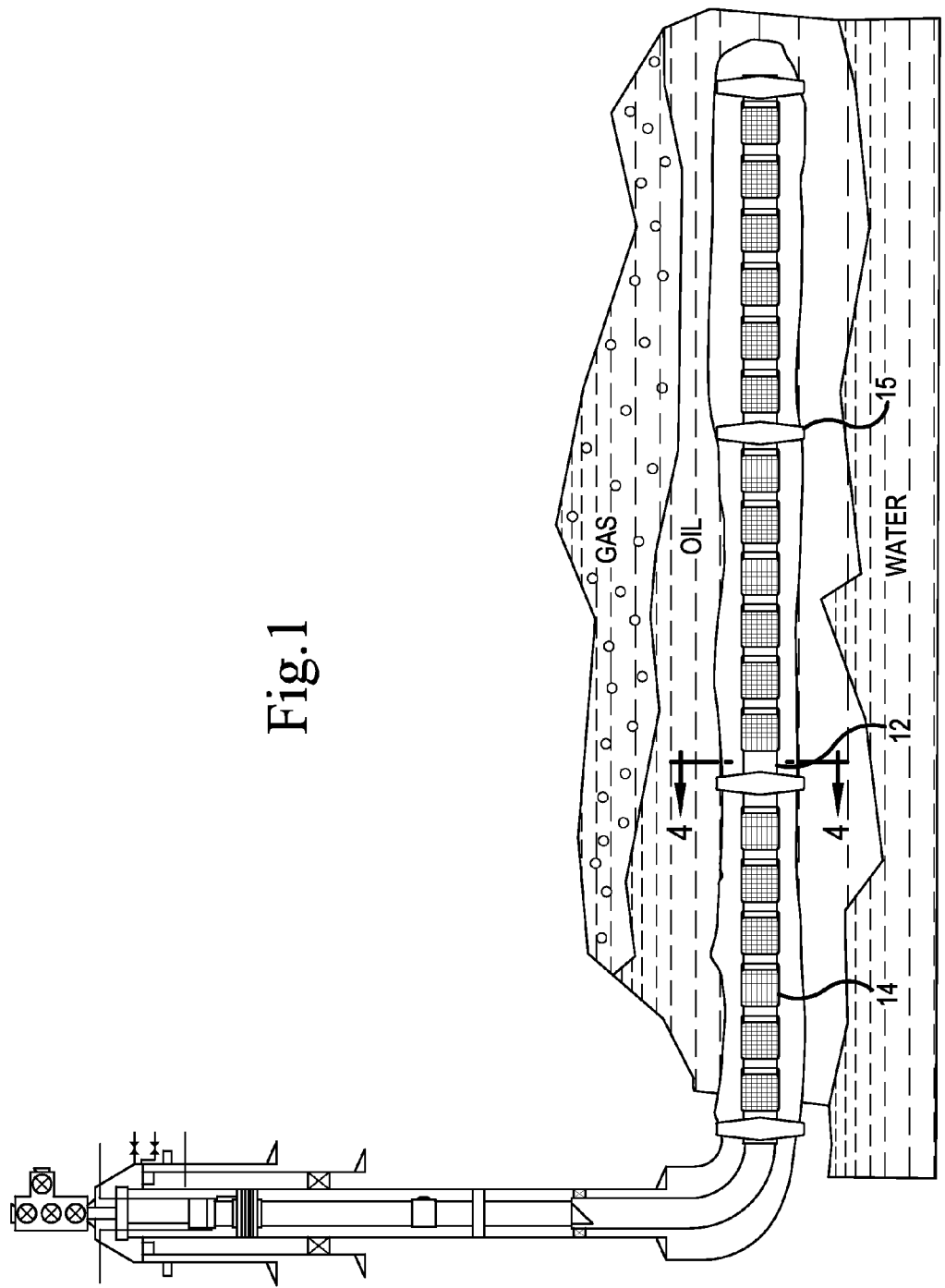

| | | | |
|---|---|---|---|
| 4,387,732 A | 6/1983 | Hetz | |
| 4,660,760 A | 4/1987 | Bennett et al. | |
| 5,435,393 A | 7/1995 | Brekke et al. | |
| 5,551,466 A | 9/1996 | De Pieri | |
| 5,803,179 A | 9/1998 | Echols et al. | |
| 5,896,928 A | 4/1999 | Coon | |
| 6,371,210 B1* | 4/2002 | Bode et al. | 166/370 |
| 6,786,285 B2 | 9/2004 | Oddie et al. | |
| 7,185,706 B2 | 3/2007 | Freyer | |
| 7,290,606 B2 | 11/2007 | Coronado et al. | |
| 7,419,002 B2 | 9/2008 | Dybevik et al. | |
| 2004/0144544 A1* | 7/2004 | Freyer | 166/369 |
| 2006/0113089 A1* | 6/2006 | Henriksen et al. | 166/386 |
| 2007/0246225 A1* | 10/2007 | Hailey et al. | 166/386 |
| 2008/0041580 A1* | 2/2008 | Freyer et al. | 166/193 |
| 2008/0135249 A1* | 6/2008 | Fripp et al. | 166/285 |
| 2008/0236843 A1* | 10/2008 | Scott et al. | 166/386 |

FOREIGN PATENT DOCUMENTS

| | | |
|---|---|---|
| GB | 2421746 | 7/2006 |
| NO | 305376 | 5/1999 |
| NO | 306127 | 9/1999 |
| WO | WO 97/38248 | 10/1997 |
| WO | WO97/38248 | 10/1997 |
| WO | WO00/63530 | 10/2000 |
| WO | WO2006/015277 | 2/2006 |
| WO | WO2007/027617 | 3/2007 |
| WO | WO2008/004875 | 1/2008 |
| WO | WO 2008004875 A1 * | 1/2008 |

\* cited by examiner

GAS VALVE AND PRODUCTION TUBING WITH A GAS VALVE

The present invention is regards a valve for a production liner utilised for the extraction of oil and gas, made for automatic shut-off of the flow of fluid into the production liner in the event of a gas breakthrough, by the valve comprising a valve seat containing at least one central inflow channel and one or more outflow channels from the valve. The invention also regards a production liner comprising a valve.

When an oil company has completed a well consisting of several branches, they wish to extract the oil before producing the gas. Very often there are thin zones of oil placed on top of a water cap and under a gas cap. Both a breakthrough of gas (from above) and a water breakthrough (from beneath) are undesired because one wishes to extract as much oil as possible and thereafter produce the gas. Up till now the breakthrough of gas has caused the displacement of the oil and the branch in a multilateral well will typically be closed off (can be accomplished using branch control valves). This typically entails that you lose the oil in the entire branch (except for some oil that might follow the gas when the gas is being produced).

A completion string consists of many production tubes, each measuring 12 meters, which are screwed together. On the production liner sand screens have been fixed to prevent sand from entering into the oil/production facility. On various places are placed swell packers sealing against the formation. The purpose is to divide the production liner into sections that can be regarded as separate production environments, i.e. prevent the multi-fluid liquid and gas to advance from one section to another except through the production liner.

By maintaining the production uninterrupted in any part of the production liner not being subject to a gas breakthrough until potentially all sections of the liner potentially suffers from such breakthrough, is calculated to provide 100% more oil from each well.

The present valve shall only shut off exactly where there is a breakthrough (the individual 12 meter joint of production liner) so that one may produce in the remaining part of the production liner and at least in the section that may be suffering from gas breakthrough in the event that the gas moves on the exterior of the liner. The shut-off shall basically take place automatically, i.e. the valve shall not be controlled from surface. Technology may be built in to enable the valve to tell the surface that it has been shut due to gas breakthrough.

Today's technology within this area consists of sand screens, ICD (Inflow Control Device) and a kill filter. The oil enters the production liner via the kill filter. ICD is a kind of pressure absorber that distributes the pressure across the production liner to avoid having to produce empty at one part whilst the differential pressure is very high at other parts of the liner. Such an absorbing or alignment is also fortunate to avoid damage to the sand screens and will also prevent that the formation falls in over the liner. If desired, the current ICD may be kept as an assurance, but the present valve will have a much better ICD-characteristic (distribution capability), since it is a much more powerful pressure absorber/pressure equalizer than the current ICD.

Other solutions have problems with nozzles that might be plugged or corrode, solutions that creates hindrances inside of the production liner and solutions that may create leaky sealings that entails that the multifluid is uncontrollable and hence undermines the very purpose of introducing these valves.

The present valve uses the Bernoulli-principle for high velocity flow over a surface/obstruction (disk). The Bernoulli-principle is being used in a number of applications and shows that a plate/disk is pulled against a seat due to the negative pressure arising. Due to the fact that the sealing is not absolute, the pressure will eventually leak to the other side of the disk so that a new attraction force is built and the sealing has been re-established. This means that the solution will be dynamic and react based on the composition of the fluid and/or gas flowing over it. The less viscosity, the higher and more immediate sealing will arise. Trials have shown that more or less all gas is stopped by a valve using the Bernoulli principle. In addition, such a valve has a positive effect on water breakthrough so that produced water is reduced simultaneously.

The characteristics of present valve is that it is relatively flat in its design so that it can be placed on the exterior of the production liner and as such supports the current technology guiding the oil along the exterior of the liner until it is permitted to enter the interior through longitudinal slots—the so-called kill filter.

An autonomous valve will according to the invention be dynamic and will uphold a given characteristic for multiphase flow of fluid without having to be controlled from the surface. Any valve being exposed to gas will immediately shut off based on the given characteristic. The gas consequently has to take another path, or it is under control. Normally it will penetrate further to another valve within the same zone segregated section so that this valve also closes. The use of zone isolation (swell packers) will prevent the gas from flowing outside of the section so that oil can be produced from all the valves only exposed to oil and/or water.

The characteristic against water is set to restrict water more than oil. One may set the characteristics so that more water is allowed to pass in the event that a lift from the water is desired to bring the oil to surface without artificial lifting.

When all oil has been produced, each liner joint may be opened so that the gas can be produced when desired. This opening will take place by opening of a valve in the chamber ahead of the valve which in turn will let the oil enter directly into the basepipe. The valve will according to the invention will not create any obstacles inside of the production liner so that the annulus flow may pass unhindered and that interventions can be performed.

As examples of prior art, the following documents are referred to: WO 2007/027617 A2, U.S. Pat. No. 7,185,706 B2, NO305.376 B1, WO 97/38248 A1, WO 2006/015277 A1, NO 306.127 B1, WO 00/63530 A1 and U.S. Pat. No. 6,786, 285 B2.

It is thus an object of the present invention is to provide an autonomous valve that shall shut off in the event of gas breakthrough in a production liner.

The above object is accomplished by a valve as defined in the characteristic part f the independent claim 1, in that the valve is constructed with a curved design equal to the shape of the outer diameter of the production liner, and is placed on the outside of the production liner, and in that a rectangular shut off disk with the same curving is arranged in the valve, in the flowing path of the liquid flow, to cause a high velocity flow over the shut off disk's surface against the valve seat, by which the shut off disk is adapted to seal against said valve seat dependant on the differential pressure being produced by the viscosity of the passing flow.

Alternative designs have been characterised by the dependant requirements 2-6.

The shut off disk may be placed in a rectangular chamber in the valve, and at least one of the central inflow channels can be an open notch covering at least half of the length of the chamber. Further, the central inflow channel's open notch in the bottom may be shaped with walls shaped as an open rectangle, by which the walls thereafter leads into a tract, and the outflow channels can be designed in a rectangular form and placed on each side of the central inflow channel.

The valve will preferably comprise a belly shaped valve section having inward protruding folds on the top, where the shut off disk is contained in said belly shaped chamber, and an upper valve section with the said seat and outflow channel, for placement over the open belly shape, wherein the outflow channels are provided between the upper and lower sections of the valve. The valve can be placed in a separate valve housing, or the production liner can act as the bottom side and the surrounding housing can constitute the upper side of the valve housing.

The valve is preferable a dynamic valve designed to uphold a given characteristic for multiphase fluid, independent from external control from surface.

The above objective is also obtained by a production liner for the exploration of oil and gas, as claimed in the independent claim 7, comprising at least one surrounding sand screen and one adjacent, surrounding inflow device, arranged to control and lead the flow of fluid into the production liner, wherein the inflow device comprises a number of chambers, in which there are flow channels between the chambers, as a pre-chamber is arranged to receive the fluid flow from the sand screen, an intermediary chamber is arranged to receive the fluid flow from the pre-chamber and automatically shut off gas further into the production liner in the event of gas breakthrough, where the valve chamber comprises a number of valves as described above, and a post camber arranged to control and direct the fluid into the production liner.

Alternative designs are characterised by independent claims 8-14.

The valve chamber may comprise a number of supporting rings fixed to the production liner, where a number of said valves are arranged in a mutual distance from each other on the circumference of the production liner between said supporting rings and mounted inside of a surrounding housing. Said supporting rings may consist of two circular rings mounted on the production liner and which are totally sealed, arranged to direct the flow of fluid and to keep the valves in place, since the valves have been mounted between the rings.

The flow shall preferably enter through the channels in the first supporting ring and thereafter flow through channels in the second supporting ring, to the post chamber.

The pre-chamber can further comprise an acid plug arranged to open for the production of gas after the oil has been produced, and/or may comprise a one-directional valve permitting for killing against the formation. The post chamber can be arranged to direct the fluid into the production liner through a kill filter.

The production liner can be equipped with an autonomic water shut off valve.

Figure 2:
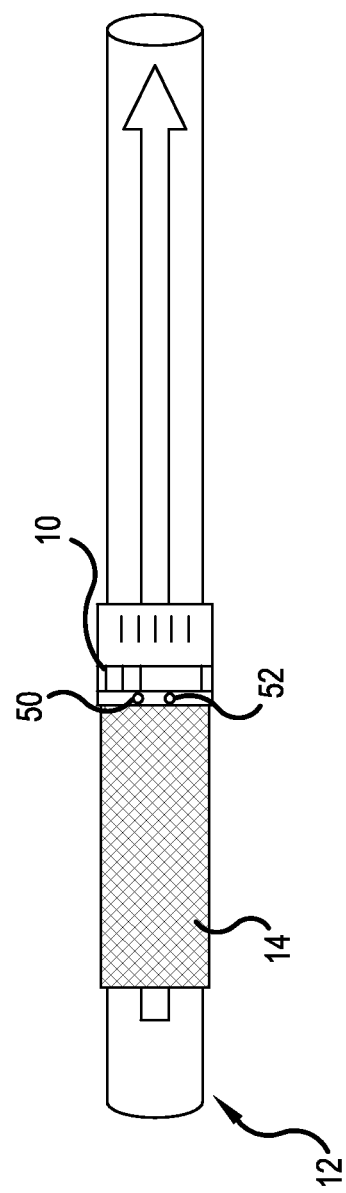
Figure 3:
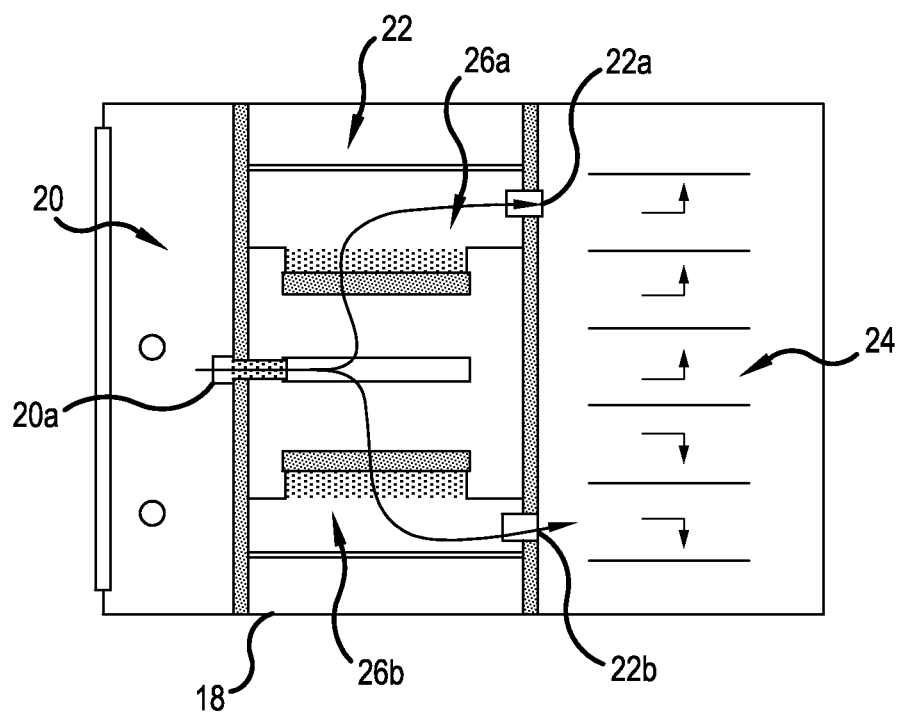
Figure 4:
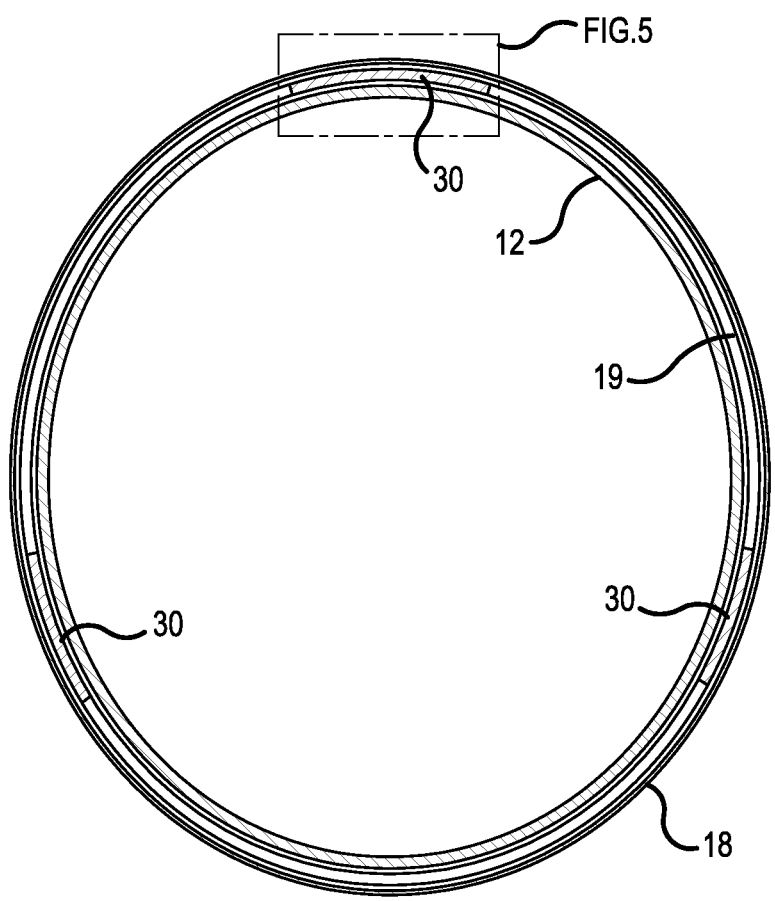
Figure 5:
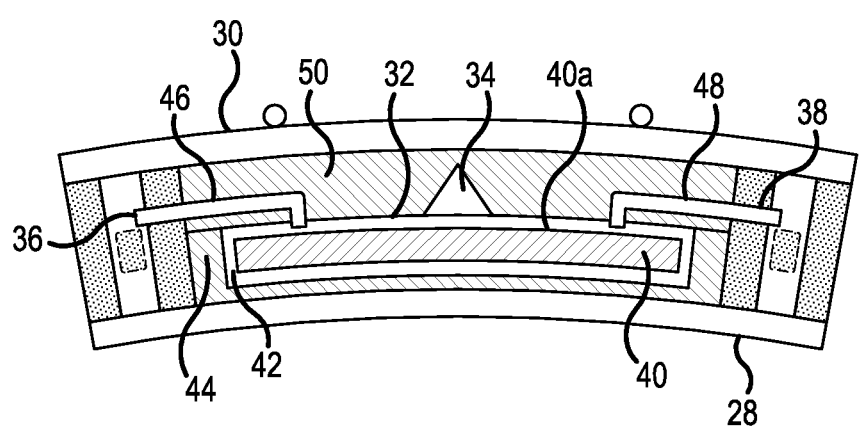
Figure 6:
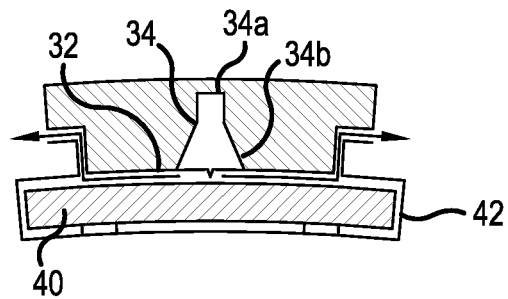
Figure 7A:
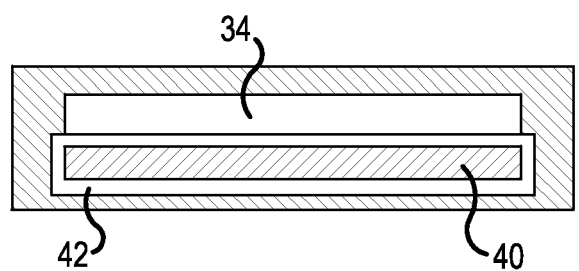
Figure 7B:
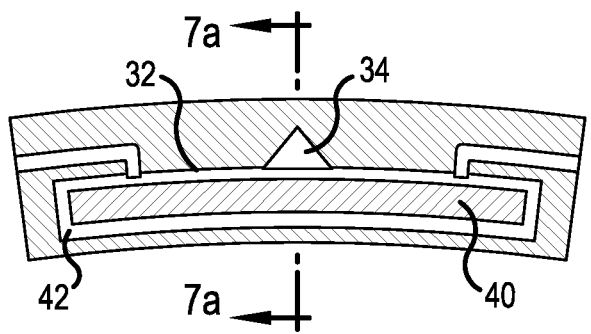

The invention will now be described in more details by the assistance from the attached figures, in which:

FIG. 1 shows a principle sketch of a completion string
FIG. 2 shows a production liner according to the invention
FIG. 3 shows the inflow device according to the invention
FIG. 4 shows a number of valves arranged on the circumference of a production liner, as according to the invention
FIG. 5 shows a cross-section of a valve according to the invention
FIG. 6 shows the flow principle in a valve according to the invention
FIGS. 7a and 7b show a cross-section of the upper and lower valve sections of a valve according to the invention, seen from the left side and from the front respectively.

FIG. 1 show a completion string in a formation for production of oil, comprising production liner 12 screwed together. On the production liners 12 sand screens 14 have been mounted to prevent sand from entering the oil. On various places swell packers 15 have been placed to split the production liner into sections so that each section can be treated as separate production environments, i.e. that the gas is not permitted to advance from one section to another unless it happens through the production liner.

In FIG. 2 a production liner 12 is shown with an inflow control device 10 according to the invention. Adjacent the inflow control device 10, a sand filter 14 is arranged around the production liner. The inflow control device 10 may comprise ICD and gas shut-off valve, kill filter or slots, acid plug 50 and a one-directional valve 52 to open for killing against the formation.

The inflow control device 10 can be designed having three chambers 20, 22, 24. Each of the chambers is separated by totally sealed sections so that the multi fluid flow basically can only flow through the flow channels in the device 10. The flow direction is from the pre-chamber 20 to the valve chamber 22 and to the post chamber 24. The fluid enters into the pre-chamber from the inside of the sand screen 14 and flow through the ring-room between the sand screen 14 and the production liner 12. Thereafter the flow is directed through the channels in the first supporting ring 19 and into the valve 30 itself. Thereafter the flow preferably flows out on the sides to small intermediate chambers 26a, 26b and then through the channels in second supporting ring to the post chamber 24. In the post chamber the fluid shall only be directed into the production liner 12, for example through the kill filter. If desired a standard channel-ICD may be mounted in front.

In the pre-chamber 20 an acidizing plug 50 may be placed to allow for the opening of gas production after all of the oil has been produced. An acid pill may be used to open it by running interventions. If an acid plug cannot be applied due to restrictions caused by the branch or branch control, a one-directional valve 52, available from the market, may be used. Alternatively a new plug can be designed to un-hatch upon a specific counter pressure from the inside of the production liner. None of the known solutions introduced, have solved this problem. It is also necessary to be able to kill the well both against the inside and against the formation. The present valve will accommodate both. The valve will in fact allow fluid to flow both ways and should in theory make a one-directional valve superfluous.

The fluid enters the pre-chamber from underneath the sand screen and flows into the ring room between the sand screen and the production liner. Thereafter it flows through first supporting ring and into the valve itself.

The support ring/frame will for example consist of two complete rings 19 which are fixed to the production liner 12 and which are totally sealed (preferably welded onto the liner). These will lead the flow of fluid and keep the valves in place. The rings should preferably be manufactured in the same material as the production liner (13% Chrome).

The valves 30 shall be mounted inside the frame (between the rings 19) and here one may place as many valve as desired (normally between 1 and 4). If one chooses only 1 or 2, the vertical orientation of the liner could potentially become a topic, so 3 or more are recommended. The top and bottom of the chambers are consequently composed by the housing 18 (which is screwed on) and the base pipe itself. The supporting rings can be made as slim or wide as desired to obtain the required strength and sealing. On the rings it should be constructed gas-tight threads (interfacing with the housing) to avoid having to use polymers. Since the supporting rings will preferably be welded onto the liner, the liner would have to be heat treated afterwards and this is why it is desired to avoid having to use polymers. The flow enters through the first supporting ring and thereafter through the valve 30 and out through the second and last supporting ring. The flow is directed to the side in some small intermediary chambers and thereafter through the channels in the second supporting ring into the post chamber 24.

I the post chamber 24 the fluid shall only be directed into the production liner 12, potentially through the kill filter. The fluid can also flow into the production liner 12 through holes if it is not desired to have kill filter.

In FIG. 5 a valve 30 (shown in a flat configuration for illustration purpose) is shown for a production liner 12, which automatically may shut off the flow of fluid into the production liner 12 in the event of gas breakthrough. Preferable, the valve 30 is arranged outside on the production liner and is constructed with a curved design equal to the shape of the outer diameter of the production liner (as shown in FIG. 4). As displayed, the valve 30 comprises a valve seat 32 containing at least one central inflow channel 34 and one or more outflow channels 36, 38 from the valve 30. In the direction of the flow through the valve 30, a rectangular, basically flat shut-off disk 40, preferably having a curvature harmonised with the outer diameter of the production liner 12 to produce high velocity flow of fluid over the surface of the disk 40a against the valve seating 32. The disk can potentially be shaped without the curvature, i.e. not following the outer diameter of the production liner. The shut-off disk 40 will thereby seal against the valve seating 32 dependant on the differential pressure arising dependant on the viscosity of the flow medium, following the Bernoulli-principle which causes the disk 40 to be pulled against the seating 32 due to the negative pressure that arises.

The shut-off valve 32 is placed in a basically rectangular chamber 42 within the valve 30, where the chamber 42 has been designed somewhat larger than the disk 40. The central inflow channel 34 is in the shown example an open notch ranging in most (at least half of) the length of the chamber. In the bottom part the open notch is shaped with walls in an open rectangular shape 34a, and the side walls exit in a funnel shape 34b. Further, the valves output channels 36, 38 are preferable rectangular shaped, and provided on each side of the central inflow channel 34.

The valve 30 comprises a lower belly shaped valve section 44 containing inward protruding folds 46, 48, to permit the shut off disk 40 to be placed in the belly shape. The valve 30 further comprises an upper valve part 50 with the valve seat 32, with inflow channel 34, to be placed over the belly shape. The outflow channels 36, 38 can thereby be placed between the upper and the lower valve sections 44, 50. The valve 30 may be arranged in a separate valve housing 28, or the production liner 12 could constitute the bottom and the housing 18 can constitute the top of the valve housing.

A production liner according to the invention can also be equipped with a water shut off valve (not shown). As one cannot know when to expect gas breakthrough, water breakthrough, or both, one or more valves covering both aspects will be the ideal and complete solution. If support for both aspects can be achieved, this will rule out all single based solutions. One cannot know where on the production liner one or the other can be expected, and distribute water and gas shut of valves based on if they shall shut of gas or water (even though the probability varies according to the distance of gas/water, but also according to permeability of the sand in the length of the liner).

Because of this, a water shut off valve can be provided, which gives permanent shut off after being exposed for water in a non-inessential period. The time before the valve closes can be controlled by designing of a locking mechanism, for example provided in calcium carbide.

A combination of gas shut off valves and water shut off valves connected in series will solve both water- and gas shut off. The water shut off valve can be placed after the gas shut off valve with ICD effect.

In summary, such a combination will solve the following:
A autonomic gas shut off valve—closes dynamic at gas breakthrough
A progressive ICD effect—distributes differential pressure even in the production liner
Autonomic water shut off valve—closes permanently at prolonged water breakthrough.

The invention claimed is:

1. A valve for a production liner in connection with the extraction of oil and gas, arranged to automatically shut off the flow of fluid into the production liner in the event of a gas break-through, whereby the valve comprises a valve seating containing at least one central inflow channel and one or more outflow channels from the valve, wherein the valve is constructed with a curved design equal to the shape of the outer diameter of the production liner, and is placed on the outside of the production liner, and a shut off plate is arranged in the valve, in the flowing path of the liquid flow, to cause a high velocity flow over the shut off plate's surface against the valve seat, wherein the shut off plate is adapted to seal against said valve seat dependant on the differential pressure being produced in the passing flow according to the Bernoulli principle.

2. The valve according to claim 1, wherein the shut off plate is rectangular and is arranged in a rectangular chamber within the valve, and where the at least one central inflow channel is an open notch protruding at least half the distance of the chamber.

3. The valve according to claim 2, wherein the open notch of the central inflow channel in the bottom is shaped by side walls of an open, rectangular form, whereby the sidewalls thereafter exists in a funnel shape, and that the outflow channels are designed with a rectangular shape and are placed on each side of the central inflow channel.

4. The valve according to claim 2, wherein the valve comprises a lower belly shaped valve part containing inward protruding top folds, where the shut-off plate is contained in said belly shape, and an upper valve part comprising said seat and inflow channel, for positioning above the open belly shape, whereby the outflow channels are provided between said upper and lower valve parts.

5. The valve according to claim 4, wherein the valve is arranged in a separate valve chamber, or that the production liner represents the bottom and a housing represents the top of the valve chamber.

6. The valve according to claim 2, wherein the valve is a dynamic valve arranged to maintain a given characteristic for multiphase flow of fluid,
independent of external control from surface.

7. A production liner for the extraction of oil and gas, comprising at least one surrounding sand screen and at least one adjacent inflow device arranged to control and direct the flow of fluid into the production liner, wherein the inflow device comprises a number of chambers, where there is flow channels between the chambers, wherein a pre-chamber is arranged to receive the flow of fluid from the sand screen, an intermediate valve chamber is arranged to receive the flow of fluid from the pre-chamber and to automatically shut off the gas from progressing into the production liner in the event of gas breakthrough, whereby the valve chamber comprises a number of valves according to claim 1, and a post chamber which is arranged to receive the flow of fluid from the valve chamber and to control and direct the flow of fluid into the production liner.

8. The production liner according to claim 7, wherein the valve chamber comprises a number of supporting rings fixed to the production liner, where the number of valves are placed with a mutual distance on the outer diameter of the production liner between said supporting rings and fixed inside of a surrounding housing.

9. The production liner according to claim 8, wherein the supporting rings constitutes two complete rings fixed to the production liner and are totally sealed, and is arranged to direct the flow of fluid and to keep the valves in place, in that the valves are positioned between the supporting rings.

10. The production liner according to claim 9, wherein the fluid entering through channels in the first supporting ring and thereafter through channels in the second supporting ring to the post chamber.

11. The production liner according to claim 7, wherein the prechamber comprises an acid plug arranged to open for gas production after the extraction of all available oil.

12. The production according to claim 7, wherein the prechamber contains a one-directional valve arranged to open.

13. The production liner according to claim 7, wherein the postchamber is arranged to direct the flow of fluid into the production liner through a kill filter.

14. The production liner according to claim 7, wherein the production liner is equipped with an autonomic water shut off valve.

15. A production liner structure for extraction of hydrocarbons, the production liner structure comprising:
a production liner; and
a valve located on an outer wall of the production liner, the valve being arranged to automatically shut off a flow of a fluid into the production liner in an event of a gas or water break-through, wherein the valve comprises:
a valve seat containing at least one inflow channel and at least one outflow channel from the valve, and
a shut off plate arranged in a fluid flow path, to cause a flow over the shut off plate's surface, wherein the shut off plate is adapted to seal against said valve seat dependant on a differential pressure produced by the fluid flow according to the Bernoulli principle; and
wherein the at least one valve outflow channel connects with a corresponding inlet channel in the outer wall of the production liner.

* * * * *

UNITED STATES PATENT AND TRADEMARK OFFICE
CERTIFICATE OF CORRECTION

PATENT NO. : 8,534,355 B2  Page 1 of 1
APPLICATION NO. : 12/600782
DATED : September 17, 2013
INVENTOR(S) : Eilif H. Johannesen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 499 days.

Signed and Sealed this
Fifteenth Day of September, 2015

Michelle K. Lee
*Director of the United States Patent and Trademark Office*